United States Patent
Bennie et al.

(10) Patent No.: US 12,036,898 B2
(45) Date of Patent: Jul. 16, 2024

(54) OPTIMIZED DRIVER SEAT AND PEDAL POSITIONING USING ULNA LENGTH

(71) Applicant: Ford Global Technologies, LLC, Dearborn, MI (US)

(72) Inventors: Clara Bennie, Sterling Heights, MI (US); Brian Bennie, Sterling Heights, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 307 days.

(21) Appl. No.: 17/384,704

(22) Filed: Jul. 23, 2021

(65) Prior Publication Data

US 2023/0022208 A1  Jan. 26, 2023

(51) Int. Cl.
| | |
|---|---|
| *B60N 2/00* | (2006.01) |
| *B60N 2/02* | (2006.01) |
| *B60W 10/30* | (2006.01) |
| *B60W 50/14* | (2020.01) |
| *B60K 23/02* | (2006.01) |

(Continued)

(52) U.S. Cl.
CPC ........... *B60N 2/0248* (2013.01); *B60W 10/30* (2013.01); *B60W 50/14* (2013.01); *B60K 23/02* (2013.01); *B60K 2023/025* (2013.01); *B60K 26/02* (2013.01); *B60K 2026/026* (2013.01); *B60N 2/0268* (2023.08); *B60T 7/06* (2013.01); *B60W 2050/0026* (2013.01);

(Continued)

(58) Field of Classification Search
CPC .......... B60N 2/0248; B60N 2002/0268; B60N 2/0244; B60W 10/30; B60W 50/14; B60W 2050/0026; B60W 2540/215; B60W 2540/221; B60W 2710/30; B60W 2050/0075; B60W 50/0098; B60K 23/02; B60K 26/02; B60K 2023/025; B60K 2026/026; B60T 7/06
See application file for complete search history.

(56) References Cited

U.S. PATENT DOCUMENTS

| | | | |
|---|---|---|---|
| 11,155,184 B1* | 10/2021 | Wang | B60N 2/06 |
| 2019/0111938 A1* | 4/2019 | Chen | H04L 41/0886 |

(Continued)

FOREIGN PATENT DOCUMENTS

| | | |
|---|---|---|
| CN | 109774779 A | 5/2019 |
| JP | 2020164135 A | 10/2020 |
| WO | 2021064335 A1 | 4/2021 |

OTHER PUBLICATIONS

"VM Barbosa, Ulna length to predict height in English and Portuguese patient populations, Oct. 12, 2011, European Journal of Clinical Nutrition" (Year: 2011).*

(Continued)

*Primary Examiner* — Tiffany P Young
(74) *Attorney, Agent, or Firm* — Frank Lollo; Eversheds Sutherland (US) LLP

(57) ABSTRACT

Systems, methods, and computer-readable media are disclosed for optimized driver seat and pedal positioning using ulna length. An example method may include determining, at a first time and using a sensor of a vehicle, an ulna length of a vehicle user. The example method may also include automatically adjusting a seating position of the vehicle user to a first seating position based on the ulna length of the vehicle user.

20 Claims, 4 Drawing Sheets

(51) Int. Cl.
*B60K 26/02* (2006.01)
*B60T 7/06* (2006.01)
*B60W 50/00* (2006.01)

(52) U.S. Cl.
CPC . *B60W 2540/215* (2020.02); *B60W 2540/221* (2020.02); *B60W 2710/30* (2013.01)

(56) References Cited

U.S. PATENT DOCUMENTS

| | | | |
|---|---|---|---|
| 2021/0039522 A1* | 2/2021 | Bove | B60N 2/0244 |
| 2021/0146803 A1* | 5/2021 | Wu | B60N 2/0232 |
| 2021/0232642 A1* | 7/2021 | Ricci | A61B 5/742 |
| 2021/0237620 A1* | 8/2021 | Mizoi | B60N 2/0284 |
| 2023/0019157 A1* | 1/2023 | Arunmozhi | G01S 17/89 |
| 2023/0068393 A1* | 3/2023 | Hannig | B60N 2/0228 |

OTHER PUBLICATIONS

"Leanne M Gauld, Height prediction from ulna length, 2004, Developmental Medicine & Child Neurology" (Year: 2004).*
Lukasz Kuta et al., "Determination of comfortable position for tractor Driver's hands based on dynamic load", Elsevier International Journal of Industrial Ergonomics 74, Oct. 25, 2019, 7 pages.
Giuseppe Andreoni et al., "Method for the analysis of posture and interface pressure of car drivers", Elsevier Applied Ergonomics 33, 2002, 12 pages.

* cited by examiner

OPTIMIZED DRIVER SEAT AND PEDAL POSITIONING USING ULNA LENGTH

BACKGROUND

By design, there are different adjustable parts in vehicles to accommodate a vehicle user's comfort. For example, seat positions, steering wheels positions, and pedal positions (to name a few examples) may be adjusted to accommodate vehicle users of different physical sizes. However, oftentimes, vehicle users with different physical attributes may be required manually adjust the configuration of vehicle to their liking. Additionally, in some cases, the vehicle configuration that is desired by a given user may not be an ergonomically-optimized configuration. For example, a vehicle user might slide a seat position to full forward and pull a steering to a high position, so that the vehicle user is almost "sandwiched" between the seat and wheel. This may be the most comfortable position for the vehicle user, but may actually be an ergonomically poor position.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
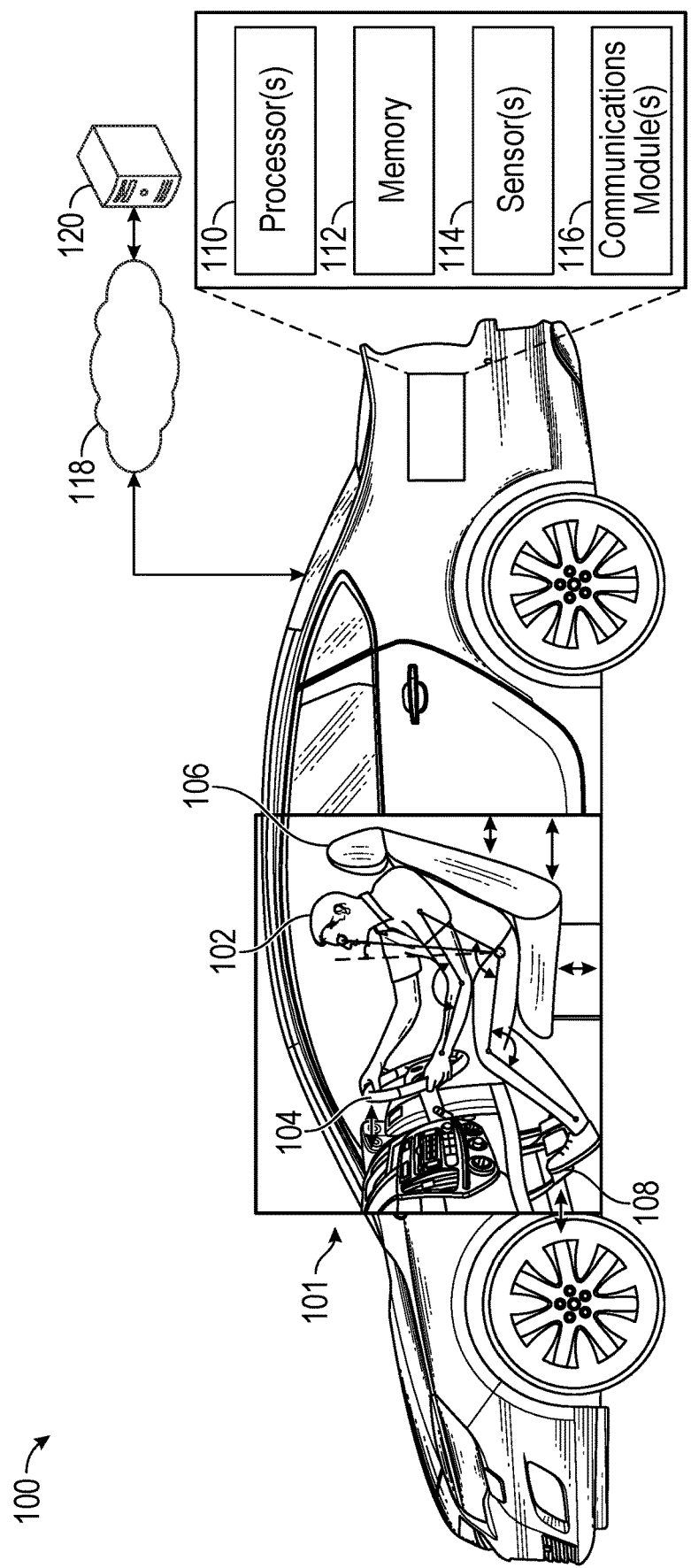
FIG. 1 depicts a schematic illustration of an example system, in accordance with one or more example embodiments of the disclosure.

This disclosure generally relates to, among other things, optimized driver seat and pedal positioning using ulna length. The ulna is a bone located in the forearm of a vehicle user. Thus, reference to an "ulna" herein may similarly refer to a forearm of the vehicle user. For example, in some cases, reference to an ulna length of a vehicle user may refer to a forearm length of the vehicle user. The systems and methods described herein may involve determining the ulna length of a given vehicle user, and using the ulna length to estimate other physical attributes of the vehicle user (for example, a height of the vehicle user, among other physical attributes). Once these physical attributes are estimated, an optimal vehicle configuration may be established for the vehicle user (for example, seat position, pedal position, etc.). Alternatively, in some cases, the optimal vehicle configuration may be established for the vehicle user based on the ulna length alone. Although reference may be made herein to seat position and pedal position, these systems and methods may also be used to adjust any other aspects of the vehicle as well (for example, air conditioning vent positioning, steering wheel positioning, etc.). The adjustments may be provided to the vehicle user as a recommendation, or may be performed automatically by the vehicle any time the vehicle user enters the vehicle.

In some embodiments, the ulna length of the vehicle user may be determined using one or more cameras of the vehicle. A camera may be located internal to the vehicle, external to the vehicle, or a combination of the two. The camera may also be a camera that is separate from the vehicle, such as a camera of a smartphone of the vehicle user, or a camera associated with external infrastructure in the environment of the vehicle as well. In some cases, the camera may provide color and/or infrared (IR) images along with depth information at each image pixel. After this information is obtained, both the depth data and image data may be processed simultaneously. From the depth data (and/or the image data), the noise may be reduced and a 3D point cloud may be reconstructed. A seat model without the vehicle user may be mapped to the 3D point cloud with the vehicle user model and may reference a statistical body model developed as reference structure. The vehicle user model may be constructed data related to the vehicle user utilizing the vehicle's sensors. The statistical body model may be a reference model generated from a sample of data that can be used as part of system calibration. This statistical body model may fit a wide range of use cases, such as different types of vehicle users, types of vehicles, etc. With face detection, the head portion of the vehicle user may be mapped to the statistical body model, which may improve accuracy of locating the coordinates of head position and its related extrapolation of other parameters of the individual like torso length, height of the individual, seat belt position. The processed depth points may be used to obtain a set of body characteristics, including at least (for example) stature, waist circumference, and weight.

The ulna length may also be determined through other suitable methods as well. For example, the vehicle user may manually input an ulna length. As additional examples, the ulna length may be determined using a relative distance to certain points in the vehicle, a triangulation distance between a seat back, arm rest, and steering wheel, arm rest marks, using an arm rest with a piezoelectric surface, using an occupant identifier, using a driver profile, using driver lookup tables, or any other suitable method. Once the ulna length is determined, the ulna length may be used to estimate a height of the vehicle user. In some cases, the estimation of the height of the vehicle user may be performed using a look-up table including various ulna measurements and associated heights. Other physical attributes of the vehicle user may also be estimated based on the ulna length and/or height of the vehicle user as well.

In some embodiments, once the height of the vehicle user is estimated based on the determined ulna length of the vehicle user, various adjustments may be made to the vehicle (or may be recommended to the vehicle user) to optimize the configuration of the vehicle to the specific vehicle user. As a first example, an optimal seating position for the vehicle user may be recommended to the vehicle user. As a second example, an optimal pedal position for the vehicle user may be recommended to the vehicle user. In some cases, both the optimal seating position and the optimal pedal position for the vehicle user may be recommended. In further cases, additional vehicle configuration recommendations may also be made (for example, steering wheel adjustments). In some cases, the vehicle may automatically adjust the seating position to the optimal seating position and/or automatically adjust the pedal position to the optimal pedal position (or may automatically make any other vehicle configuration changes) rather than simply providing a recommendation. In some cases, the optimal seating position of the user may include a seating position in which a predetermined angle exists in an arm of the vehicle user when they are sitting in the optimal seating position and gripping a steering wheel of the vehicle at particular locations (for example, the "3 o'clock" and "9 o'clock" positions on the steering wheel). For example, the predetermined angle may be a 120 degree angle. The predetermined angle may also include a range of angles, rather than a single angle. In some cases, the predetermined angle may be determined by the one or more camera. For example, the angle that exists in the arm of the vehicle user may be determined using 3D keypoint localization and distance estimation. That is, the angle may be determined by performing triangulation between three different points in space relative to a cameras fixed positions (x,y,z) of each point and estimating the vector distance between them. The angle in the vehicle user's arm may also be determined through any other suitable method as well. In some cases, these adjustments, or any other types of adjustments described herein or otherwise, may be established for the vehicle user based on the ulna length alone.

Additionally, in some embodiments, the systems and methods described herein may guide a vehicle user towards an ergonomically-optimal vehicle configuration based on the vehicle user's physical attributes. For example, if the vehicle recommends certain vehicle configurations based on a vehicle user's determined height, and the vehicle user chooses to ignore the recommendations and manually performs a different configuration, then the vehicle may present an alert to the vehicle user. For example, the alert may indicate to the vehicle user that the manual configuration they selected is not ergonomically optimized. In some cases, the vehicle may prevent the vehicle user from making certain manual adjustments if it is determined that the adjustments may present a high risk condition to the vehicle user. A "high risk condition" may include a condition that might prevent or limit the ability of the vehicle user to reach the steering wheel of the vehicle (or otherwise limit the ability of the vehicle user to operate the vehicle). For example, a high risk condition may include facing a seat in a wrong direction. Another example high risk condition may include a shorter driver adjusting the seat to be a maximum distance from the steering wheel at a maximum seat angle. These are just two non-limiting examples, and a high risk condition may include other conditions as well. However, the vehicle user may be able to override any of these limitations established by the vehicle as well.

In some embodiments, these determinations may be made for any number of vehicle users as well. For example, if a driver and a passenger both enter the vehicle, the one or more cameras may be used to determine the ulna length of both vehicle users so that vehicle configuration settings applicable to the two users may be determined. That is, the driver seat may be adjusted differently than the passenger seat depending on the determined physical attributes of the two vehicle users. Additionally, once an initial vehicle configuration is determined for a given vehicle user, the vehicle may store the vehicle configuration in memory such that any time the vehicle user enters the vehicle, the vehicle may automatically configure the vehicle to the stored vehicle configuration for the particular vehicle user (for example, automatically adjust the seat position, etc.). In some cases, a specific vehicle user may have multiple vehicle configurations for a single vehicle. For example, different configurations may be used depending on which seat the vehicle user will be using for a ride (front seat, back seat, window seat, etc.). Additionally, a vehicle user may have multiple configurations stored for the same seat in the vehicle depending on how the vehicle user intends to use the vehicle for a given ride. For example, if the vehicle is a performance vehicle, and the vehicle user intends to engage in spirited driving, then the seat may be positioned differently than if the user intends to drive the vehicle conservatively.

The systems and methods described herein may provide a number of advantages. A first advantage may include providing a method to optimize the seat, steering wheel, and pedal position (as well as other configurable aspects of a vehicle) for performance and ergonomics based on specific physical attributes of a given vehicle user. This may allow vehicle users to optimize configuration of the vehicle to match their specific physical requirements. These optimized settings may also be saved for future use by the vehicle user, and configuration settings may be stored for multiple vehicle users. In this regard, any time a different vehicle user enters the vehicle, the vehicle may either automatically adjust the vehicle configuration (for example, the seating position, pedal position, etc.) to the stored configuration associated with the particular vehicle user. Alternatively, the vehicle user may manually select a stored configuration to be applied by the vehicle. Additionally, if multiple vehicle users enter the vehicle at the same time, the different seats that the different vehicle users occupy may adjust. For example, a driver seat may adjust based on the stored configuration settings for the driver, and a passenger seat may adjust based on the stored configuration settings for the passenger. A second advantage may include providing proper seating position in order to improve vehicle user ergonomics. This may translate to increased comfort for the vehicle user.

Turning to the figures, FIG. 1 depicts a schematic illustration of an example system 100. The system may include a vehicle 101. The vehicle 101 may be any type of vehicle, such as a gasoline powered vehicle, an electric vehicle, a hybrid electric vehicle, or an autonomous vehicle (to name a few non-limiting examples). The vehicle 101 may include one or more adjustable components, such as, for example, a steering wheel 104, a seat 106, a pedal 108, and/or any other number of adjustable components. The vehicle may also include one or more processors 110, memory 112, one or more sensors 114, and/or one or more communication module(s) 116. In some cases, the vehicle 101 may be in communication with a remote server 120 through a communications network 118. The vehicle may also include any of the components described with respect to the computing device 500 of FIG. 5, as well as any other components.

In some embodiments, vehicle 101 may include one or more processors 110 that may include any suitable processing unit capable of accepting digital data as input, processing the input data based on stored computer-executable instructions, and generating output data. The computer-executable instructions may be stored, for example, in data storage and may include, among other things, operating system software and application software. The computer-executable instructions may be retrieved from the data storage and loaded into the memory 112 as needed for execution. The processor 110 may be configured to execute the computer-executable instructions to cause various operations to be performed. Each processor 110 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

In some embodiments, the memory 112 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 112 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

In some embodiments, the sensors 114 may include one or more cameras. The cameras may be positioned at various location inside and/or outside of vehicle 101. In some examples, one or more cameras may be used to capture images and/or videos of a vehicle 102 in order to determine an ulna length of the user. The sensors 114 may also include any other types of sensors as well, such as one or more ultrasonic or other proximity sensors, LIDAR, Bluetooth, or other sensors. In some examples, data gathered by the sensors 114 may be used to perform any of the operations described herein (for example, such as determining optimal vehicle configurations for a vehicle user 102 given the physical attributes of the vehicle user 102).

In some embodiments, the communication module 116 may be configured to communicate with the server 120 using one or more wireless communication protocols. The communication module 116 may be configured to receive and transmit data between the vehicle 101 and the server 120. The communication module 116 may also be used by the vehicle 101 to communicate with other entities as well, such as other vehicles, infrastructure, etc. These communications may be performing using communication protocols such as vehicle-to-vehicle (V2V), vehicle-to-infrastructure (V2I), etc.

Figure 2:
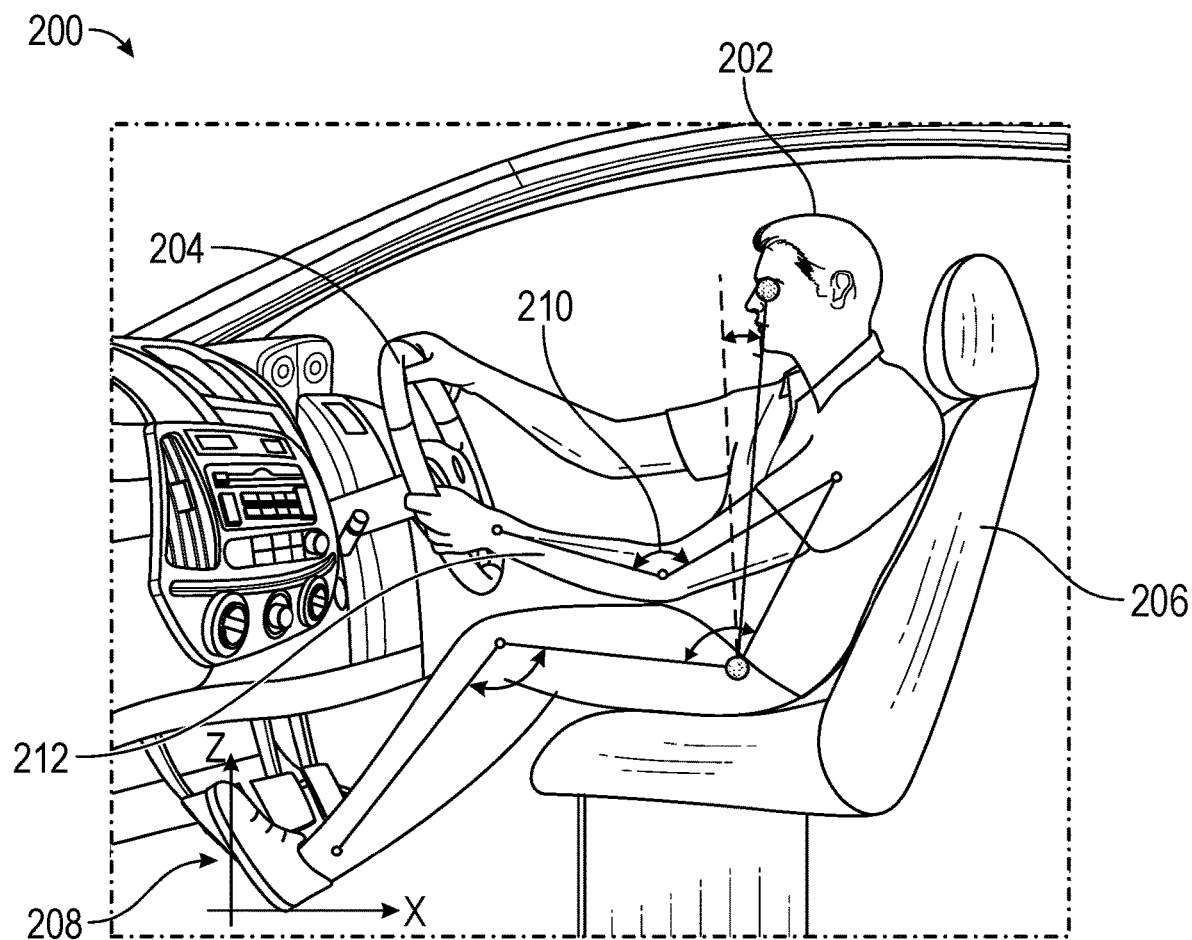
FIG. 2 depicts an example diagram, in accordance with one or more example embodiments of the disclosure.

In some embodiments, server 120 may be configured to carry out one or more functions or actions described herein. That is, in some cases, the operations described herein may be performed at the remote server 120 rather than locally at the vehicle 101. Server 120 may include or be part of a computing system, such as the computing device 500 described with respect to FIG. 5. As such, server 120 may be a single computing device or may be multiple computing devices. In some examples, FIG. 2 depicts an example diagram 200. Particularly, the diagram 200 may provide a reference point for different physical attributes of a vehicle user 202 that may be considered when determining an optimal seating position and/or pedal position (or an optimal configuration for any other vehicle components, such as a steering wheel position) as described herein. The diagram 200 may depict a vehicle user 202 located inside a vehicle (not shown). The vehicle may include a steering wheel 204 and one or more pedals 208, as well as a seat 206 (to name a few non-limiting components of the vehicle). As depicted in the figure, physical attributes of the vehicle user 202 that may be used to determine the optimal vehicle configuration for the vehicle user 202 may include at least an ulna length 212 of the vehicle user 202. Additionally, an angle 210 of an arm of the vehicle user 202 may also be considered. That is, the vehicle may initially determine the ulna length 212 of the vehicle user 202, and, once the ulna length 212 is determined, a height (as well as other physical attributes) of the vehicle user 202 may be estimated. The optimal vehicle configuration may then be determined based on the physical attributes of the vehicle user 202, and, in some cases, the vehicle 101 may automatically make the adjustments. It may then be confirmed if the vehicle configuration is optimal. For example, the angle 210 of an arm of the vehicle user 202 may be determined. If this angle 210 is within a predetermined range, then the vehicle configuration may be determined to be optimal. However, this is merely one example of a method by which it may be determined if the vehicle configuration is optimal, and is not intended to be limiting.

Figure 3:
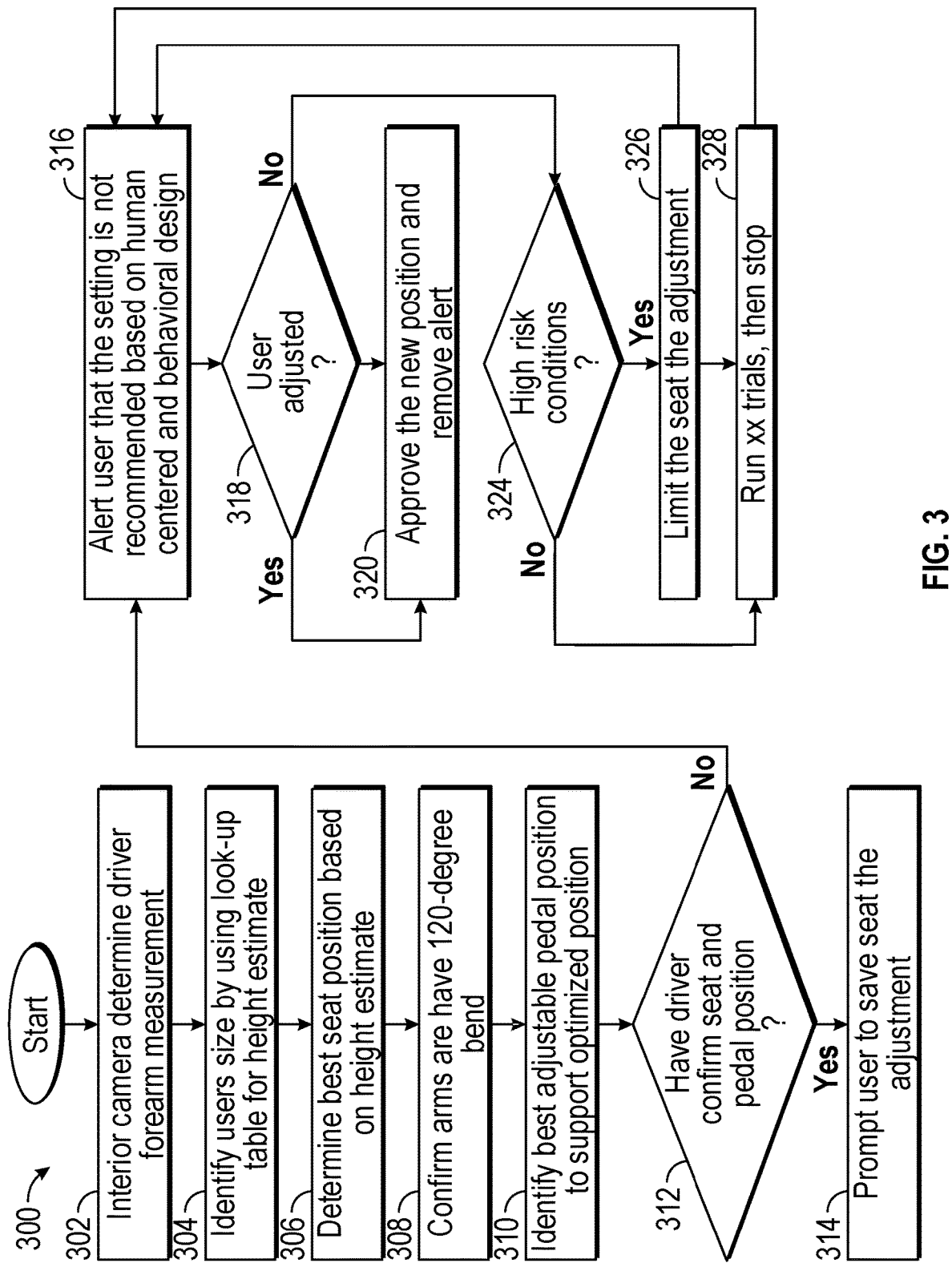
FIG. 3 depicts an example flowchart, in accordance with one or more example embodiments of the disclosure.

FIG. 3 depicts an example flowchart 300. The flowchart 300 may depict some of the operations involved in performing the vehicle configuration adjustments as described herein. In some embodiments, the flowchart 300 may begin with operation 302, which may involve determining an ulna length of a vehicle user. In some cases, the ulna length of the vehicle user may be determined using one or more cameras of the vehicle. Any of the camera(s) may be located internal to the vehicle, external to the vehicle, or a combination of the two. Any of the camera(s) may also be a camera that is separate from the vehicle, such as a camera of a smartphone of the vehicle user, or a camera associated with external infrastructure in the environment of the vehicle as well. The ulna length may also be determined through other suitable methods as well. For example, the vehicle user may manually input an ulna length (and/or any other methods described herein or not described herein). Following operation 302, operation 304 may involve identifying a height of the vehicle user based on the determined ulna length of the vehicle user. In some cases, the height of the vehicle user may be estimated using a look-up table including ulna lengths and associated vehicle user heights. In addition to the height of the user, other physical attributes of the vehicle user may also be determined as well.

In some embodiments, once the physical attributes of the vehicle user are determined (for example, based on the determined ulna length of the vehicle user), the flowchart 300 may proceed to operation 306. Operation 306 may include determining an optimal seating position for the vehicle user based on the estimated height of the vehicle user. In some cases, the optimal seating position of the user may include a seating position in which a predetermined angle exists in an arm of the vehicle user when they are sitting in the optimal seating position and gripping a steering wheel of the vehicle at particular locations (for example, the "3 o'clock" and "9 o'clock" positions on the steering wheel). For example, the predetermined angle may be a 120 angle. The predetermined angle may also include a range of angles, rather than a single angle. The optimal seating position for the vehicle user may also be determined in any other manner as well. Operation 306 may be followed by operation 308, which may involve confirming that the predetermined bend angle exists in an arm of the vehicle user. In some cases, the angle in the vehicle user's arm may be determined by the one or more cameras (for example, using 3D keypoint localization and distance estimation). The existence of the bend angle in the user's arm may also be determined through any other methods as well. Operation 308 may be followed by operation 310, which may involve identifying an optimal pedal position for the vehicle user based on the determined optimal seating position. In some cases, the pedal position for the vehicle user may also be determined using a look-up table. For example, the look-up table may include optimal pedal positions based on physical parameters associated with vehicle users, such as ulna length or height and/or based on optimal seating positions, as well as any other factors. Additionally, although the flowchart 300 only specifically describes determining seating position and pedal position for the vehicle user, any other aspects of the vehicle may also be determined as well (for example, steering wheel position, etc.). Any reference specifically made to seating position and pedal position may also apply to any other aspects of the vehicle.

In some embodiments, these determinations may be made for any number of vehicle users as well. For example, if a driver and a passenger both enter the vehicle, the one or more cameras may be used to determine the ulna length of both vehicle users so that vehicle configuration settings applicable to the two users may be determined. That is, the driver seat may be adjusted differently than the passenger seat depending on the determined physical attributes of the two vehicle users. Additionally, once an initial vehicle configuration is determined for a given vehicle user, the vehicle may store the vehicle configuration in memory such that any time the vehicle user enters the vehicle, the vehicle may automatically configure the vehicle to the stored vehicle configuration for the particular vehicle user (for example, automatically adjust the seat position, etc.). In some cases, a specific vehicle user may have multiple vehicle configurations for a single vehicle. For example, different configurations may be used depending on which seat the vehicle user will be using for a ride (front seat, back seat, window seat, etc.). Additionally, a vehicle user may have multiple configurations stored for the same seat in the vehicle depending on how the vehicle user intends to use the vehicle for a given ride. For example, if the vehicle is a performance vehicle, and the vehicle user intends to engage in spirited driving, then the seat may be positioned differently than if the user intends to drive the vehicle conservatively.

In some embodiments, operation 310 may be followed by condition 312. Condition 312 may involve a determination as to whether the vehicle user has provided a confirmation of the optimal seating position and the optimal pedal position. For example, upon determining the optimal seating position and/or the optimal pedal position, the vehicle may provide a prompt to the vehicle user to determine if the vehicle user is satisfied with the optimal seating position and/or the optimal pedal position. In some cases, the prompt may be provided through a Human Machine Interface (HMI) of the vehicle, may be send to a mobile device associated with the user, may be provided as an auditory prompt, or may be provided in any other suitable manner. The vehicle user may provide the confirmation through any suitable method as well. For example, the vehicle user may make a selection via the HMI of the vehicle or a mobile device, may provide an auditory confirmation, etc. If the vehicle user provides a confirmation of the optimal seating position and/or the optimal pedal position, then at operation 314, the optimal seating position and/or the optimal pedal position may be stored in memory (for example, memory local to the vehicle, or at a remote location). In some cases, the optimal seating position and/or the optimal pedal position may automatically be stored in memory without requiring input from the vehicle user. The optimal seating position and/or the optimal pedal position may more specifically be stored in association with the particular vehicle user such that vehicle configuration settings (for example, the optimal seating position and/or the optimal pedal position) may be stored for multiple vehicle users. If it is determined that the vehicle user has not provided confirmation of the optimal seating position and the optimal pedal position (for example, the vehicle user rejects a recommendation to change the seating position and/or pedal position, or the vehicle user changes the seating position and/or pedal position after automatic adjustments are performed), then the flowchart 300 may proceed to operation 316.

In some embodiments, operation 316 may involve providing a notification to the vehicle user that the optimal seating position and the optimal pedal position are recommended for the vehicle user. Operation 316 may be followed by condition 318. Condition 318 may involve determining whether the vehicle user has adjusted the seating position and the pedal position to the optimal positions, or positions within an acceptable range of the optimal positions. If it is determined in condition 318 that the user has adjusted the seating position and the pedal position, then the flowchart 300 may proceed to operation 320. Operation 320 may involve approving the new seating position and/or the pedal position, Operation 320 may also involve removing the alert and storing the user-adjusted seating position and/or pedal position in memory. However, if it is determined that the user did not adjust the seating position and/or the pedal position, then the flowchart 300 may proceed to condition 324. Condition 324 may involve a determination as to whether the current seating position and/or the pedal position presents a high risk condition to the vehicle user. A "high risk condition" may include a condition that might eliminate driver from reaching and operating the vehicle. For example, a high risk condition may include facing a seat in a wrong direction. Another example high risk condition may include a shorter driver adjusting the seat to be a maximum distance from the steering wheel at a maximum seat angle. These are just two non-limiting examples, and a high risk condition may include other conditions as well. If it is determined that the current seating position and/or the pedal position presents a high risk condition to the vehicle user, then the flowchart 300 may proceed to operation 326. However, it is determined that the current seating position and/or the pedal position does not present a high risk condition to the vehicle user, then the flowchart 300 may proceed to operation 328.

Figure 4:
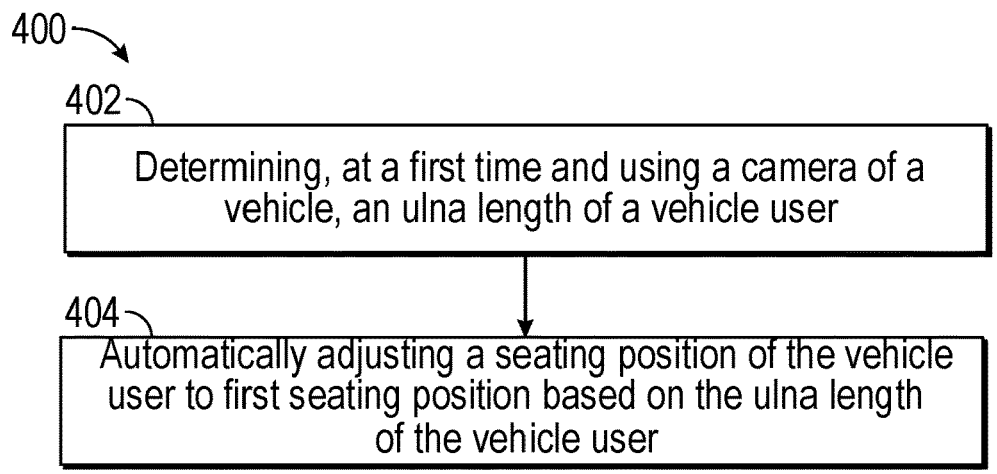
FIG. 4 depicts an example method, in accordance with one or more example embodiments of the disclosure.

In some embodiments, operation 326 may involve limiting manual adjustments performed by the vehicle user. The flowchart 300 may also return back to operation 316 from operation 326 in some cases. For example, the vehicle may limit the vehicle user's ability to configure the vehicle (for example, adjust the seat position, etc.) and may alert the vehicle user that the changes they are attempting to make are not recommended. In some cases, however, the vehicle user may be able to override this loop in the flowchart 300, and manually configure the vehicle to a configuration that may otherwise not be optimal. For example, if the vehicle user wishes to manually configure certain aspects of the vehicle, regardless of a manual configuration being ergonomically undesirable, the vehicle user may override these operations through an input to the HMI of the vehicle, or through any other methods. Operation 328 may involve determining whether a threshold number of loops from operation 316 to operation 326 have been performed. That is, the alert may only be provided to the vehicle occupant a threshold number of times so the alert is not continuously provided. In some cases, the alert may be stopped for a particular time period, and may be presented to the vehicle user again after the period of time. For example, the alert may be lopped five times, may not be presented for an hour, and then the alert may be looped again after the hour period subsides. FIG. 4 is an example method 400. At block 402 of the method 400 in FIG. 4, the method may include determining, at a first time and using a sensor of a vehicle, an ulna length of a vehicle user. Block 404 of the method 400 may include automatically adjusting a seating position of the vehicle user to a first seating position based on the ulna length of the vehicle user.

In some embodiments, the method 400 may also include confirming that a predetermined bend angle exists in an arm of the vehicle user.

In some embodiments, the method 400 may also include estimating, based on the ulna length of the vehicle user, a height of the vehicle user, wherein automatically adjusting the seating position is further based on the height of the vehicle user.

In some embodiments, the method 400 may also include automatically adjusting a position of a pedal of the vehicle to a first pedal position based on at least one of: the ulna length of the vehicle user or the first seating position.

In some embodiments, the method 400 may also include sending a prompt to the vehicle user to confirm the first seating position. The method 400 may also include receiving a confirmation of the first seating position. The method may also include storing, in memory and in association with the vehicle user, the first seating position.

In some embodiments, the method 400 may also include determining that the vehicle user entered the vehicle at a second time. The method 400 may also include automatically adjusting a current seating position to the first seating position.

In some embodiments, the method 400 may also include identifying an adjustment of a seating position of the vehicle to a second seating position. The method 400 may also include determining that the second seating position does not match a seating position in a look-up table for the ulna length of the vehicle user, or determining that a bend angle in an arm of the vehicle user is different than a predetermined bend angle. The method 400 may also include sending an alert to the vehicle user.

In some embodiments, estimating the height of the vehicle user based on the ulna length of the vehicle user is performed using a look-up table.

Figure 5:
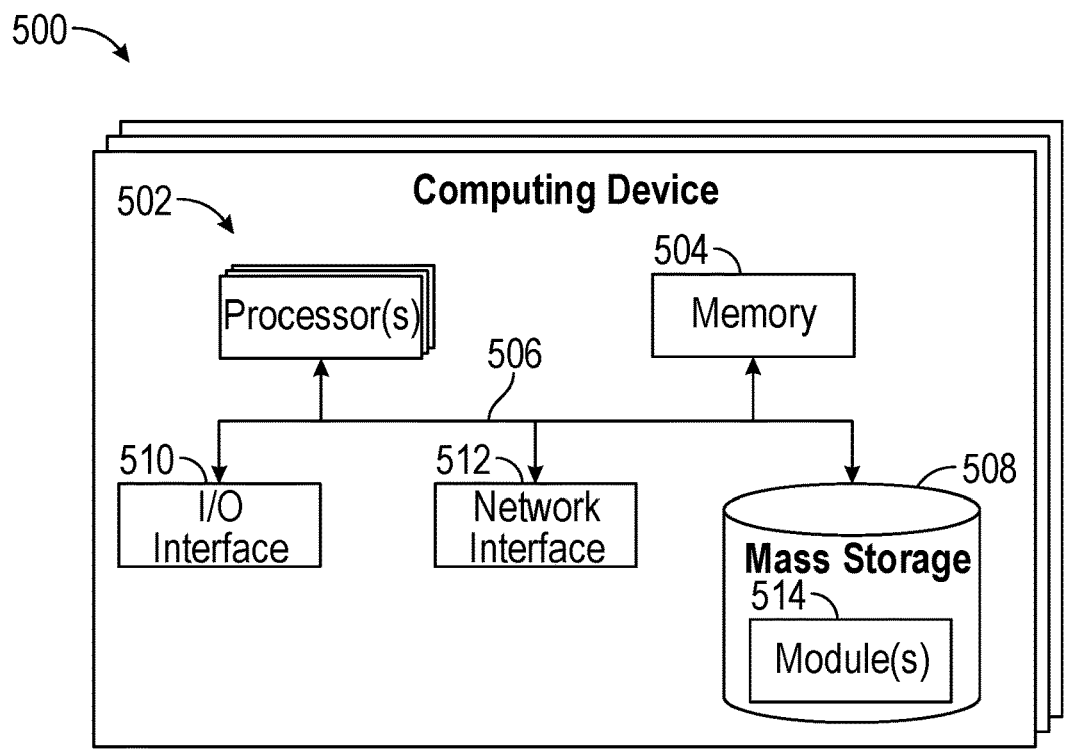
FIG. 5 depicts an example computing system, in accordance with one or more example embodiments of the disclosure.

FIG. 5 illustrates an example computing device 500, in accordance with one or more embodiments of this disclosure. The computing 500 device may be representative of any number of elements described herein, such as any of the controllers, and/or any other element described herein. The computing device 500 may include at least one processor 502 that executes instructions that are stored in one or more memory devices (referred to as memory 504). The instructions can be, for instance, instructions for implementing functionality described as being carried out by one or more modules and systems disclosed above or instructions for implementing one or more of the methods disclosed above. The processor(s) 502 can be embodied in, for example, a CPU, multiple CPUs, a GPU, multiple GPUs, a TPU, multiple TPUs, a multi-core processor, a combination thereof, and the like. In some embodiments, the processor(s) 502 can be arranged in a single processing device. In other embodiments, the processor(s) 502 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) portion; and parallel computing portions with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 502 can access the memory 504 by means of a communication architecture 506 (e.g., a system bus). The communication architecture 506 may be suitable for the particular arrangement (localized or distributed) and type of the processor(s) 502. In some embodiments, the communication architecture 506 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Interface Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), moveable RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 504 also can retain data.

Each computing device 500 also can include mass storage 508 that is accessible by the processor(s) 502 by means of the communication architecture 506. The mass storage 508 can include machine-accessible instructions (e.g., computer-readable instructions and/or computer-executable instructions). In some embodiments, the machine-accessible instructions may be encoded in the mass storage 508 and can be arranged in components that can be built (e.g., linked and compiled) and retained in computer-executable form in the mass storage 508 or in one or more other machine-accessible non-transitory storage media included in the computing device 500. Such components can embody, or can constitute, one or many of the various modules disclosed herein. Such modules are illustrated as modules 514. In some instances, the modules may also be included within the memory 504 as well.

Execution of the modules 514, individually or in combination, by at least one of the processor(s) 502, can cause the computing device 500 to perform any of the operations described herein.

Each computing device 500 also can include one or more input/output interface devices 510 (referred to as I/O interface 510) that can permit or otherwise facilitate external devices to communicate with the computing device 500. For instance, the I/O interface 510 may be used to receive and send data and/or instructions from and to an external computing device.

The computing device 500 also includes one or more network interface devices 512 (referred to as network interface(s) 512) that can permit or otherwise facilitate functionally coupling the computing device 500 with one or more external devices. Functionally coupling the computing device 500 to an external device can include establishing a wireline connection or a wireless connection between the computing device 500 and the external device. The network interface devices 512 can include one or many antennas and a communication processing device that can permit wireless communication between the computing device 500 and another external device. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 512 may also be used to facilitate peer-to-peer ad-hoc network connections as described herein.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

That which is claimed is:

1. A method comprising:
   determining, at a first time and using a sensor of a vehicle, only an ulna length of a vehicle user;
   determining, based only on the ulna length of the vehicle user, a plurality of optimal vehicle configurations for a corresponding plurality of vehicle components, comprising at least:
   determining, based only on the ulna length of the vehicle user, a first optimal pedal position of a pedal of the vehicle for the vehicle user;
   and automatically adjusting, using a processor of the vehicle, the plurality of vehicle components based at least in part on the optimal vehicle configurations determined for the vehicle user.

2. The method of claim 1, further comprising:
   confirming that a predetermined bend angle exists in an arm of the vehicle user.

3. The method of claim 1, wherein determining, based at least in part on the ulna length of the vehicle user, the plurality of optimal vehicle configurations for the corresponding plurality of vehicle components comprises:
   determining, based at least in part on the ulna length of the vehicle user, a first optimal steering wheel position of a steering wheel of the vehicle for the vehicle user; and
   determining, based at least in part on the ulna length of the vehicle user, a first optimal seating position of a seat of the vehicle for the vehicle user.

4. The method of claim 3, further comprising:
   estimating, based on the ulna length of the vehicle user, a height of the vehicle user, wherein automatically adjusting the optimal seating position is further based on the height of the vehicle user.

5. The method of claim 4, wherein estimating the height of the vehicle user based on the ulna length of the vehicle user is performed using a look-up table.

6. The method of claim 3, further comprising:
   sending a prompt to the vehicle user to confirm the first optimal seating position;
   receiving a confirmation of the first optimal seating position; and
   storing, in memory and in association with the vehicle user, the first optimal seating position.

7. The method of claim 6, further comprising:
   determining that the vehicle user entered the vehicle at a second time; and
   automatically adjusting a current seating position to the first optimal seating position.

8. The method of claim 1, further comprising:
   identifying an adjustment of a seating position of the vehicle to a second seating position;
   determining that the second seating position does not match a seating position in a look-up table for the ulna length of the vehicle user, or determining that a bend angle in an arm of the vehicle user is different than a predetermined bend angle; and
   sending an alert to the vehicle user.

9. The method of claim 1, wherein determining the ulna length is based on at least one of: a relative distance to certain points in the vehicle, a piezoelectric surface in an arm rest of the vehicle, or a driver profile.

10. A system comprising:
    a processor; and
    memory storing computer-executable instructions, that when executed by the processor, cause the processor to:
    determine, at a first time and using a sensor of a vehicle, an ulna length of a vehicle user;
    determine, based only on the ulna length of the vehicle user, a plurality of optimal vehicle configurations for a corresponding plurality of vehicle components, comprising to at least:
    determine, based only on the ulna length of the vehicle user, a first optimal pedal position of a pedal of the vehicle for the vehicle user; and
    automatically adjust the plurality of vehicle components based at least in part on the optimal vehicle configurations determined for the vehicle user.

11. The system of claim 10, wherein the computer-executable instructions further cause the processor to:
    confirm that a predetermined bend angle exists in an arm of the vehicle user.

12. The system of claim 10, wherein the computer-executable instructions to determine, based at least in part on the ulna length of the vehicle user, the plurality of optimal vehicle configurations for the corresponding plurality of vehicle components include instructions that cause the processor to:
    determine, based at least in part on the ulna length of the vehicle user, a first optimal steering wheel position of a steering wheel of the vehicle for the vehicle user; and
    determine, based at least in part on the ulna length of the vehicle user, a first optimal seating position of a seat of the vehicle for the vehicle user.

13. The system of claim 12, wherein the computer-executable instructions further cause the processor to:
    estimate, based on the ulna length of the vehicle user, a height of the vehicle user, wherein automatically adjusting the first optimal seating position is further based on the height of the vehicle user.

14. The system of claim 13, wherein estimating the height of the vehicle user based on the ulna length of the vehicle user is performed using a look-up table.

15. The system of claim 12, wherein the computer-executable instructions further cause the processor to:
    send a prompt to the vehicle user to confirm the first optimal seating position;
    receive a confirmation of the first optimal seating position; and
    store, in memory and in association with the vehicle user, the first optimal seating position.

16. The system of claim 15, further comprising:
    determining that the vehicle user entered the vehicle at a second time; and automatically adjusting a current seating position to the first optimal seating position.

17. The system of claim 10, wherein the computer-executable instructions further cause the processor to:
identify an adjustment of a seating position of the vehicle to a second seating position;
determine that the second seating position does not match a seating position in a look-up table for the ulna length of the vehicle user, or determine that a bend angle in an arm of the vehicle user is different than a predetermined bend angle; and
send an alert to the vehicle user.

18. A non-transitory computer-readable medium storing computer-executable instructions, that when executed by a processor, cause the processor to perform operations including:
determining, at a first time and using a sensor of a vehicle, an ulna length of a vehicle user;
determining, only on the ulna length of the vehicle user, a plurality of optimal vehicle configurations for a corresponding plurality of vehicle components, comprising:
determining, based only on the ulna length of the vehicle user, a first optimal pedal position of a pedal of the vehicle for the vehicle user; and
automatically adjusting the plurality of vehicle components based at least in part on the optimal vehicle configurations determined for the vehicle user.

19. The non-transitory computer-readable medium of claim 18, wherein the computer-executable instructions further cause the processor to perform operations including:
confirming that a predetermined bend angle exists in an arm of the vehicle user.

20. The non-transitory computer-readable medium of claim 18 wherein the computer-executable instructions further cause the processor to perform operations including:
determining, based at least in part on the ulna length of the vehicle user, a first optimal steering wheel position of a steering wheel of the vehicle for the vehicle user; and
determining, based at least in part on the ulna length of the vehicle user, a first optimal seating position of a seat of the vehicle for the vehicle user.

* * * * *